United States Patent [19]

Mori et al.

[11] 4,420,332
[45] Dec. 13, 1983

[54] PROCESS FOR THE PRODUCTION OF REDUCED IRON AND THERMAL CRACKING OF HEAVY OILS

[75] Inventors: Kenji Mori; Kiichi Narita; Ryuzo Ijiri; Tsuneo Morimitsu; Dentaro Kaneko, all of Kobe; Nobuo Uemura, Nishinomiya; Yoshifumi Kameoka; Mamoru Taniuchi, both of Kobe, all of Japan

[73] Assignee: Research Association for Residual Oil Processing, Tokyo, Japan

[21] Appl. No.: 329,033

[22] Filed: Dec. 9, 1981

[30] Foreign Application Priority Data

Dec. 22, 1980 [JP] Japan ............................... 55-182441

[51] Int. Cl.³ ............................................. C21B 13/02
[52] U.S. Cl. ........................................... 75/26; 75/35; 208/112; 252/373; 423/415 A; 423/651
[58] Field of Search ....................... 75/26, 33, 34, 36; 208/10, 112, 106; 423/651, 415 A; 252/373

[56] References Cited

U.S. PATENT DOCUMENTS

| | | | |
|---|---|---|---|
| 3,551,138 | 12/1970 | Brown et al. | 75/26 |
| 3,712,807 | 1/1973 | Volk | 75/34 |
| 3,985,548 | 10/1976 | Leas et al. | 75/36 |
| 4,147,615 | 4/1979 | Leas | 208/10 X |
| 4,224,140 | 9/1980 | Fujimori et al. | 208/124 |
| 4,298,460 | 11/1981 | Fujimori et al. | 208/121 |
| 4,308,173 | 12/1981 | Fujimori et al. | 208/119 |
| 4,325,812 | 4/1982 | Fujimori et al. | 208/119 |
| 4,339,329 | 7/1982 | Kageyama et al. | 208/10 |

FOREIGN PATENT DOCUMENTS 739407  7/1966  Canada ................................ 75/26

*Primary Examiner*—M. J. Andrews
*Attorney, Agent, or Firm*—Frishauf, Holtz, Goodman & Woodward

[57] ABSTRACT

The invention provides a novel process for concurrently carrying out production of reduced iron and thermal cracking of heavy oils in which the reaction of thermal cracking is performed in a fluidized state with the fine iron ore as the fluidized medium and the particles of the iron ore become coated with deposits of the carbonaceous by-product material. The fine iron ore with the carbon deposited thereon is introduced in a fluidized-bed reducing furnace and there reduced into reduced iron by contacting with a reducing gas which is produced in a gas reformer from the cracked gas or the residual oil separated from the products of the thermal cracking. In an improvement of the above process, the gas reformer is operated as a fluidized-bed reactor with the reduced iron as the fluidized medium and acting as the reforming catalyst. The reduced iron partially reoxidized in the reforming reaction is again reduced to completely reduced iron either by recycling into the fluidized-bed reducing furnace or by introducing into a second fluidized-bed reducing furnace.

26 Claims, 5 Drawing Figures

PROCESS FOR THE PRODUCTION OF REDUCED IRON AND THERMAL CRACKING OF HEAVY OILS

BACKGROUND OF THE INVENTION

The present invention relates to a process for producing reduced iron and thermal cracking of heavy oils or, more particularly, relates to a process which is a combination of the thermal cracking of heavy oils to produce lighter oils and cracked gases simultaneously along with the manufacture of reduced iron by the reduction of an iron ore utilizing the products obtained in the above mentioned thermal cracking as the reducing agent.

As is well known, it is an unavoidable current or future trend in the petroleum industry that the crude oils supplied to the industry become heavier and heavier along with the decreasing availability of high-quality lighter crude oils due to the exhaustion of the petroleum resources. Accordingly, early establishment of the technology for producing lighter oils, e.g. gasoline and gas oil, by the thermal cracking of such heavier crude oils is a matter of great concern for those in a diversity of fields as it is indispensable for the future development of the industry.

One of the processes of early establishment for the production of lighter oils by the thermal cracking of heavy oils is the so-called fluidized-bed catalytic cracking (FCC) process in which a heavy oil is contacted with catalyst particles of silica-alumina and the like in a fluidized state and catalytically cracked. A problem in the FCC process is the necessity of frequent regeneration of the catalyst since the activity of the catalyst decreases relatively rapidly due to the deposition of the carbon or coke formed in the thermal cracking of the heavy oil on the catalyst particles. Moreover when residual oil is used as feed stock, metals such as Ni and V are deposited on catalyst surfaces, and thus regeneration of this catalyst with the metal deposit is very difficult. Another disadvantage of the FCC process is the limitation in the starting heavy oils since the process is usually applicable only to distilled oils such as gas oils and several kinds of high-grade residual oils among heavy oils.

In connection with the above described FCC process, the so-called fluid coking process is also widely practiced in which the by-product coke formed in the thermal cracking of the heavy oil is taken out as a product. The principle of this method is the thermal cracking of the heavy oil with the powdery coke in the fluidized state as the medium for heat transfer as well as the fluidizing medium. Therefore, this process involves no problem of deactivation of the catalyst by the deposition of the by-product coke thereon because the powdery coke is used not as a catalyst but merely as the medium for the heat transfer and fluidization and is advantageous in the ease of processing heavy oils to be used generally for the production of feed oils to the FCC process. The by-product coke is discharged out of the reactor and a part thereof is used by combustion as the heat source for pre-heating the powdery coke circulating in the reactor, the balance of the by-product coke being obtained as a product. In contrast to the delayed coking process as a method for processing heavy oils, this fluid coking process is advantageous in that the process can be operated as a completely continuous process and that the yields of the cracking products are high. The process is, however, defective in the quality of the coke as the product because the only use of the product coke is as a fuel.

On the other hand, a process recently under rapid development in the iron and steel making industry is the production of so-called reduced iron by the direct reduction of iron ore in a solid state brought into contact with a reducing agent. Usually the iron ore is reduced to the reduced iron which is further melted and refined in an electric furnace into a steel. In comparison with the conventional steel making process using a blast furnace and a converter in which the iron ore is first reduced in a blast furnace into a pig iron containing an excess amount of carbon which is then subjected to the oxidizing removal of the excess of carbon, together with the removal of the accompanying silicon, phosphorus and other impurities in a converter to give a sound steel, this process of direct reduction has several advantages that the process does not involve excessive reduction of the ore followed by oxidation thereof and that the process does not require any coking coal such as the coke material used in the blast furnace. Nevertheless, the process has found no world-wide prevalence because hydrogen and carbon monoxide as the reducing agents used in the process are available with sufficient economy only in several limited regions throughout the world.

To give a more detailed explanation for the above mentioned direct reduction iron making process by means of gaseous reductants, the iron oxides in the iron ore are reduced with the gaseous reducing agent composed of hydrogen and carbon monoxide obtained by contacting natural gas, i.e. methane, with an oxidizing gas, e.g. steam or carbon dioxide, at a high temperature in the presence of a catalyst. That is, the reaction involved in this process is a solid-gas contacting reaction between iron oxides and a reducing gas irrespective of the type of the furnace for the reduction which may be a furnace using a fluidized bed or fixed bed or a shaft furnace.

As is mentioned above, this process is very promising as a technology to be developed in future owing to the above described advantages but, on the contrary, includes several problems in the availability of the energy source and difficulties in the operational conditions:

(a) The most economical source as the reducing agent is natural gas at least for the moment and the regions where natural gas is available with economy are limited in the world.

(b) Reforming of the natural gas into the reducing gas, i.e. a gaseous mixture which is principally composed of carbon monoxide and hydrogen, is not an inexpensive process due to the large investment for the installation of the plant and the large running cost because the facilities for the production of the reducing gas, i.e. reformer, must be constructed using tubes of expensive heat-resisting steel in large numbers filled with a large amount of the catalyst.

(c) In contrast to the blast furnace process in which the maximum temperature in the furnace eventually exceeds 1500° C., the reaction temperature in the direct reduction iron making process usually can not exceed 850° C. notwithstanding the desirable higher productivity and higher efficiency of energy obtained at a higher temperature of the reducing gas. This is because, when operated at an excessively high temperature, the particles of the metallic iron formed by the reduction adhere to each other eventually resulting in the phenomenon of sintering with the layer of the particles forming a blocked continuous body so that the process can run no longer with stability. When the process is performed using a fluidized bed, in particular, in which the particle size distribution of the iron ore is finer than otherwise, increase of the reducing temperature higher than 800° C. cannot be expected due to sintering of fine partially reduced iron particles, and the advantages of the higher velocities of the reducing reaction and heat transfer inherently obtained in a fluidized bed process are restricted.

In view of the above described current trend in the exhausting situation of petroleum resources and the development of the iron making technology, it is an object of this invention to establish a process in which a by-product of the thermal cracking of heavy oils is utilized as the reducing agent in the production of reduced iron concurrently with the production of lighter oils.

SUMMARY OF THE INVENTION

It is an object of the present invention to provide a novel and improved process which uniquely combines the fluidized-bed thermal cracking of heavy oils to produce lighter oils and the process for the production of reduced iron utilizing the by-product carbon formed in the oil cracking process as a reducing agent in the iron making process.

Another object of the present invention is to provide an improved process for the production of reduced iron by the high temperature operation of a fluidized bed at a temperature of from 800° to 1000° C. freed from such problems of the fluidized bed reduction in the prior art as the phenomenon of sintering.

The process of the present invention for concurrently carrying out the production of reduced iron and the thermal cracking of heavy oils comprises the steps of (a) introducing fine iron ore into a fluidized-bed thermal cracking reactor together with a heavy oil to effect thermal cracking of the heavy oil to produce products of the thermal cracking and a carbonaceous by-product which deposits on the particles of the fine iron ore, (b) introducing the particles of the fine iron ore thus coated with the deposited carbonaceous material as the by-product in the step (a) into a fluidized-bed reducing furnace to be contacted therein with a reducing gas at a high temperature and to be reduced to reduced iron, (c) separating the cracked gas, light oil and residual oil by distillation from the products of the thermal cracking produced in the step (a), (d) reforming the cracked gas or the residual oil in a gas reformer into a reducing gas mainly composed of hydrogen and carbon monoxide, and (e) introducing the reducing gas into the fluidized-bed reducing furnace.

DETAILED DESCRIPTION OF THE PREFERRED EMBODIMENTS

Figure 1:
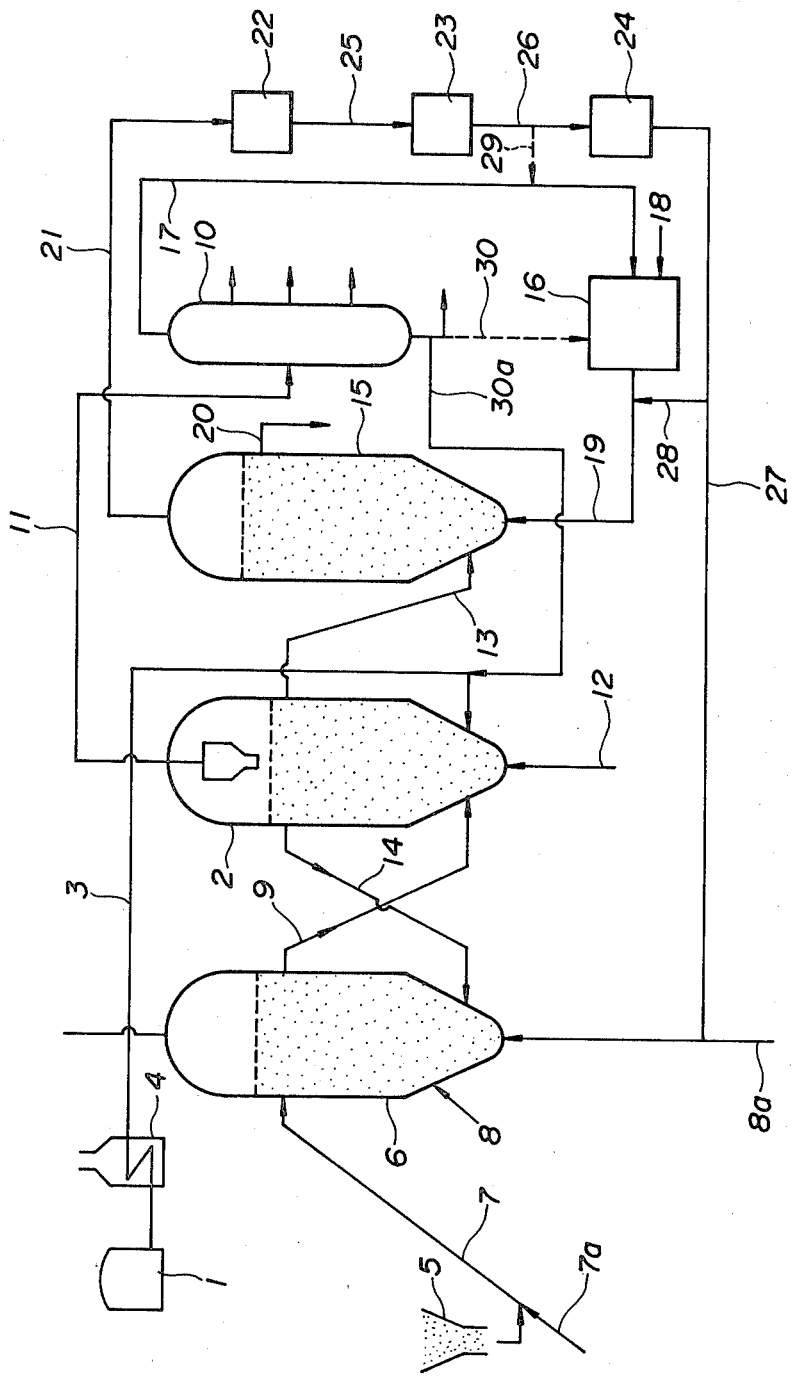
FIG. 1 is a flowsheet of the basic process according to the present invention.

As is mentioned above, the fundamental concept of the process of this invention is, in a process for concurrently performing the production of lighter oils and cracked gas by the thermal cracking of heavy oils in a fluidized-bed thermal cracking reactor containing the fine iron ore in a fluidized state and the production of reduced iron by the reduction of the fine iron ore of which the particles are coated with the by-product carbon formed in the fluidized-bed thermal cracking reactor, the utilization of the products of the thermal cracking discharged out of the fluidized-bed thermal cracking reactor as the starting material or the feed material for the production of the reducing gas to be introduced into the fluidized-bed reducing furnace by separating the cracked gas or the residual oil therefrom and reforming them into the reducing gas.

Another important feature of the process of this invention is the re-circulation of a part of the fine iron ore from the fluidized-bed thermal cracking reactor to the separately installed ore pre-heater along with the introduction of the exhaust gas at high temperatures discharged out of the fluidized-bed reducing furnace and/or with the introduction of preheated air by which carbonaceous material on the iron ore is partially oxidized into the ore pre-heater and is used as the heat source for the heating of the ore powder.

As is mentioned above, the reducing furnace for the production of the reduced iron in the process of this invention is a fluidized-bed type one although such a method of reduction in a fluidized-bed per se is known in the art and, for example, a method has been proposed in which iron ore is reduced to metallic iron in a continuous process using fluidized-bed reducing furnaces in multiple steps.

In the reduction of a fine iron ore in a fluidized bed in the prior art processes, however, the particle size of the fine iron ore is limited not to be fine enough because the flow rate of the reducing gas is limited when the particle size of the fine iron ore is excessively small adversely affecting the productivity or the rate of reduction. The use of a finely divided iron ore itself is advantageous due to the increased reactivity of the iron ore with the reducing gas at a higher reaction velocity leading to an increase of the productivity but the reaction temperature sometimes becomes excessively high due to the increased reactivity so that the particles of the fine iron ore or the reduced iron tend to adhere to each other to give a detrimental effect to the state of fluidization of the fine ore eventually resulting in a phenomenon of so-called sintering and consequently in discontinuation of the operation of the fluidized-bed reaction. Therefore, it is imperative first of all in the high temperature reduction of fine iron ore to avoid this phenomenon of sintering.

As a means to avoid such a phenomenon of sintering in the reduction of fine iron ore in a fluidized bed, there have been proposed several methods of, for example, using an iron ore with a particle size distribution as coarse as possible, agitating the fluidized-bed mechanically, admixing powdery coke with the iron ore and the like but none of these methods is satisfactory; each has its own disadvantages accompanying the advantages.

Alternatively, an improved method is disclosed in Japanese Patent Publication 44-14161 according to which the surface of the ore particles is coated with an oxide having a higher melting point such as magnesium oxide, calcium oxide and the like admixed in an amount of 0.1 to 5% by weight with the fine iron ore in fluidization whereby the phenomenon of sintering can be minimized and the reduction in a fluidized bed can be successfully performed at a high temperature. This method is, however, industrially not practicable due to the unduly high costs caused by the complicated process of coating of the ore particles with an oxide having a higher melting point.

The process of the present invention is very unique in this respect and provides a novel and improved method for the production of reduced iron by the high temperature operation of a fluidized bed at a temperature from 800° to 1000° C. freed from such problems of the fluidized bed reduction in the prior art as the phenomenon of sintering. According to the invention, the particles of the iron ore are coated with a carbonaceous material formed and deposited thereon in the course of the thermal cracking of heavy oils and the reduction of the iron ore is performed in a fluidized state with the ore particles coated with the carbonaceous material so that the phenomenon of sintering can no longer take place.

In the following, a basic embodiment of the process of this invention is illustrated in detail with reference to FIG. 1 showing a flow sheet of the process.

One of the starting materials used in the process of the present invention is a heavy oil. The grade of the heavy oil is not particularly limited but a heavy oil such as a residual oil from distillation under reduced having 5 to 35% of the Conradson carbon and a specific gravity of 0.90 to 1.1 is suitably used. The boiling point of the heavy oil is more than 900° F. (482° C.), preferably more than 950° F. (510° C.). The heavyoil is stored in the oil reservoir 1 from which it is sent to the fluidized-bed thermal cracking reactor 2 through the piping 3 after being heated in an oil pre-heater 4 at a temperature insufficient to cause thermal decomposition thereof such as 400° C. or below. In the fluidized-bed thermal cracking reactor 2 the heavy oil is contacted with the fine iron ore in a fluidized state.

The fine iron ore as the other starting material in the process of this invention is finely pulverized in advance to an average particle diameter of 10 to 300 μm, preferably 20–200 μm and is stored in a hopper 5 from which the fine iron ore is sent to an ore pre-heater 6 through the piping 7, in some case together with steam injected into the piping 7a. In the ore pre-heater 6, the fine iron ore is heated to a temperature of 600° to 700° C. by the combustion of a part of cracked gas produced by thermal cracking of the heavy oil and/or the reducing gas introduced thereinto from the undermentioned fluidized-bed reducing furnace and/or a part of the deposited carbon on the ore particles recycled from the fluidized-bed thermal cracking reactor 2 by the air introduced into the ore pre-heater 6 through the piping 8. The thus heated fine iron ore is introduced into the fluidized-bed thermal cracking reactor 2 through the piping 9.

As is mentioned above, the heavy oil introduced into the fluidized-bed thermal cracking reactor 2 is contacted with the fine iron ore introduced thereinto from the ore pre-heater 6 and usually 70% to 90% of the heavy oil is thermally cracked there into products of thermal cracking which are discharged out of the reactor 2 at the top and introduced into the fractionation system 10 through the piping 11 and separated there into the individual fractions of, for example, cracked gas, naphtha, gas oil and residual oil.

The fine iron ore in the above mentioned thermal cracking reactor 2 is brought into fluidized state by means of steam introduced thereinto at the bottom through the piping 12. The feed rates of the fine iron ore and the steam are controlled such that stable fluidization is established in the reactor 2 at a temperature in the range from 400° to 630° C. or, preferably, from 500° to 600° C. In the reactor 2, iron ore, hematite ($Fe_2O_3$) is partially reduced to magnetite ($Fe_3O_4$) and when the temperature of the thermal cracking is further increased, the reduction rate of the iron ore is increased in this stage. However, an excessively high temperature of thermal cracking is generally disadvantageous from the standpoint of lighter oil production so that the above defined range of the temperature of operation is recommended.

The linear space velocity in the fluidized-bed thermal cracking reactor 2 is maintained preferably at 50 cm/second or smaller at a pressure inside the reactor of 3 $kg/cm^2$ or below which is determined taking into consideration the particle size distribution of the fine iron ore. As is mentioned above, about 70 to 100% of the heavy oil introduced into the fluidized-bed thermal cracking reactor 2 is cracked therein and discharged at the top of the reactor 2 as the cracked products to be sent to the fractionation system 10 through the piping 11 while by-product carbon of comprising about 10 to 30% of the heavy oil is produced and deposited on the particles of the fine iron ore which are then transported to the next operation through the piping 13.

The reaction of thermal cracking which takes place in the fluidized-bed thermal cracking reactor 2 is an endothermic reaction so that a sufficient quantity of heat must be supplied to the reactor 2. This quantity of heat is mainly brought into the reactor carried by the heated fine iron ore introduced from the ore pre-heater 6. In order to maintain the temperature in the thermal cracking reactor 2 at the desired level as mentioned above, a part of the fine iron ore coated with the by-product carbon in the thermal cracking reactor 2 is recycled to the ore pre-heater 6 through the piping 14 and again introduced into the thermal cracking reactor 2 after being heated in the ore pre-heater 6 through the piping 9. That is to say, a circulating circuit for the fine iron ore is formed between the ore pre-heater 6 and the fluidized-bed thermal cracking reactor 2 connected by two pipes 9 and 14 whereby a sufficient supply of heat to the thermal cracking reactor 2 is ensured. The amount of the by-product carbon coated on the fine iron ore is usually from 3 to 10% based on the weight of said ore. The proportion of the fine iron ore recycled to the ore pre-heater 6 in the total discharge of the ore from the thermal cracking reactor 2 is naturally determined in consideration of various parameters. That is, large parts, preferably about 70% or more of the fine iron ore is recycled to the ore pre-heater 6 while the remainder is sent through the piping 13 to the reducing furnace 15 in which the iron ore is reduced to the reduced iron.

The ore pre-heater 6 is not limited to any particular type provided that the structure is suitable for continuous heating of the fine iron ore. The reducing furnace 15 is also of the fluidized-bed type and the fine iron ore introduced thereinto is brought to a fluidized state by means of the reducing gas at high temperature blown into the furnace 15 at the bottom. The reducing gas is composed mainly of hydrogen and carbon monoxide and reacts with the iron ore to reduce it into reduced iron according to the following reaction equations in steps.

First step:

$$Fe_3O_4 + H_2 \rightarrow 3FeO + H_2O$$

$$Fe_3O_4 + CO \rightarrow 3FeO + CO_2$$

Second step:

$$FeO + H_2 \rightarrow Fe + H_2O$$

$$FeO + CO \rightarrow Fe + CO_2$$

It should be noted in this case that the reducing gas at high temperature used in the above described reaction of reduction is a reformed gas obtained by the reforming of the cracked gas and the reforming or partial oxidation of the residual oil by distillation separated from the cracking products discharged from the fluidized-bed thermal cracking reactor 2.

The process of the reforming utilizing the cracked gas as the feed material follows. The cracked product discharged from the thermal cracking reactor 2 at the top thereof is introduced into the fractionation system 10 and the cracked gas separated therefrom in the system 10 is sent to a reducing gas preparation system 16 including reformer, partial oxidation furnace, gas purifier, shift converter, etc. which is hereinafter referred to as the "reformer 16" or as the "fluidized-bed reformer 16", through the piping 17 and reacted there with the steam introduced through the piping 18 to be converted into a reformed gas mainly composed of hydrogen and carbon monoxide.

The reformed gas obtained in the reformer 16 is, as is mentioned before, introduced into the reducing furnace 15 at the bottom through the piping 19 as the reducing gas at high temperature also serves as the fluidizing gas for the particles of the iron ore. The temperature in the reducing furnace 15 can be as high as 800° C. or higher since the particles of the iron formed by the reduction are not susceptible to sintering with each other in the fluidized-bed by virtue of the carbon deposition on the particles of the iron ore provided in the fluidized-bed thermal cracking in the reactor 2. The carbonaceous material deposited on the particles of the iron ore also acts as a reducing agent at such a high temperature and contributes to the reduction of the iron ore according to the following reaction equation:

$$Fe_3O_4 + 4C \rightarrow 3Fe + 4CO$$

The fluidized-bed reducing furnace 15 is supplied with a sufficiently large quantity of heat since the heat is brought thereinto in two ways by the fine iron ore primarily heated in the ore pre-heater 6 and by the reducing gas at high temperature. When the temperature of the reducing gas is sufficiently high, the reducing atmosphere in the fluidized-bed reducing furnace 15 is readily maintained at a sufficiently high temperature of 800° to 1000° C. and the fine iron ore is reduced by both of the deposited carbonaceous material and the reducing gas into reduced iron of 85 to 95% metallization (ratio of metallic iron to the total iron) to be discharged out of the reducing furnace 15 through the piping 20 and sent to a plant for further processing (not shown in the figure) according to any known procedure.

The exhaust gas discharged out of the fluidized-bed reducing furnace 15 through the piping 21 is at a temperature of about 500° to 900° C. and contains a large volume of hydrogen and carbon monoxide. Thus, the exhaust gas after cooling is subjected successively to the removal of dust, moisture, sulfur compounds and a part of carbon dioxide by passing through a dust collector 22, desulfurizer 23 and decarbonator 24 connected in series with pipings 25 and 26. The thus purified exhaust gas with hydrogen and carbon monoxide as the principal component is utilized as a heat source or as a reducing agent in the ore pre-heater 6 and/or in the fluidized-bed reducing furnace 15. That is, a part of the gas is, according to need, sent to the ore pre-heater 6 through the piping 27 where it is used to heat the fine iron ore. The other part of the exhaust gas is confluently combined with the reformed gas flowing through the piping 19 via the branched piping 28 and blown into the fluidized-bed reducing furnace 15 where it is utilized as a component of the reducing gas to form a recycling circuit including the furnace 15 and the purification system of the dust collector 22, desulfurizer 23 and decarbonator 24.

An alternative way for the utilization of the exhaust gas at high temperature discharged out of the fluidized-bed reducing furnace 15 is to supply the gas after removal of the moisture, dust and sulfur compounds to the reformer 16 to be combined with the cracked gas coming from the fractionation system 10 through the by-path piping 29 to be used as a part of the reducing gas. It is of course a further possible way to be taken into consideration that the exhaust gas is, after removal of the moisture, dust and sulfur compounds, directly combined with the reformed gas at the exit of the reformer 16 and recycled to the fluidized-bed reducing furnace 15 (the circuit is not shown in the figure).

To describe the composition of the exhaust gas from the fluidized-bed reducing furnace 15 in detail, the sulfur compounds contained therein originate in the sulfureous material in the starting heavy oil. That is, the fine iron ore with casrbon deposition introduced into the reducing furnace 15 necessarily contains sulfur compounds as combined with the iron ore and the deposited carbon since the heavy oil contains sulfur compounds more or less. Therefore, the reaction of reduction of the iron ore taking place in the fluidized-bed reducing furnace 15 is necessarily accompaned by the so-called hydrogenation desulfurization which is the reaction of the sulfur constituent in the carbon-coated iron ore particles with the hydrogen gas in the reducing gas to form hydrogen sulfide. Accordingly, the exhaust gas discharged from the fluidized-bed reducing furnace 15 contains the above mentioned hydrogen sulfide along with the unreacted hydrogen and carbon monoxide as well as carbon dioxide and water as the products of the reducing reaction in the furnace 15. The total content of the unreacted hydrogen and carbon monoxide is usually about 40% so that the exhaust gas can be used as such as a fuel gas and may be supplied to the ore pre-heater 6 where it is burned and serves as a source for heating the iron ore.

The exhaust gas is of course re-usable as the reducing gas in the reducing furnace 15 after removal of the moisture by condensation with cooling, removal of the dust in the dust collector 22 and removal of the hydrogen sulfide in the desulfurizer 23. The route for supplying the thus purified exhaust gas to the reducing furnace may be different as follows according to the composition of the gas and other parameters.

(1) When the concentration of carbon dioxide in the exhaust gas is low or the volume of the exhaust gas is limited, the exhaust gas may be directly combined with the reformed gas at the exit of the gas reformer 16 and introduced into the reducing furnace 15 provided that the index of reducing power R defined by the equation:

$$R = (CO + H_2)/(CO_2 + H_2O)$$

is at least 8 in the gaseous mixture of the reformed gas and the exhaust gas.

(2) When the concentration of carbon dioxide in the exhaust gas is high so that the R value above defined of the gaseous mixture of the reformed gas and the exhaust gas would be smaller than 8, the exhaust gas is passed through the decarbonator 24 to decrease the concentration of carbon dioxide and thereafter combined with the reformed gas at the exit of the reformer 16 via the piping 28 to be introduced into the reducing furnace 15.

(3) The exhaust gas after desulfurization is supplied to the reformer 16 via the piping 29 to combine with the cracked gas coming from the fractionation system 10. In this case, the carbon dioxide in the exhaust gas is converted to carbon monoxide in the reformer 16.

Aside from the above description directed to the utilization of the cracking gas from the fractionation system 10 as the feed in the reformer 16 to prepare the reducing gas, it is also possible to prepare the reducing gas by the partial oxidation of the distillation product residual oil discharged from the fractionation system 10 at the bottom thereof when the cracked gas obtained at the top of the fractionation system 10 finds other uses such as a heat source of processes and the like. In this case, a part of the residual oil discharged from the fractionation system 10 at the bottom is introduced into the reformer 16 (in this case, reformer 16 is composed of gasifier, partial oxidation furnace, shift convertor, gas purifier etc.) via the piping 30 shown by a broken line in FIG. 1 and gasified there by partial oxidation. Residual oils usually contain large amounts of unsaturated and aromatic constituents so that the residual oil should be partially oxidized to form the gases of hydrogen and carbon monoxide by introducing steam and/or oxygen (which may be air) at high temperatures.

The reducing gas at high temperature thus formed in the reformer 16 is introduced into the fluidized-bed reducing furnace 15 and cause the reduction of the iron ore as well as to the desulfurization reaction. A part of the residual oil discharged from the fractionation system 10 is recycled to the thermal cracking reactor 2 through piping 30a.

The foregoing is a description of the basic process according to the present invention. An advantage of the process of the present invention is the versatility in the selection of the starting heavy oil because formation of the carbonaceous material in the step of the thermal cracking is essentially not a matter to be avoided as it is used for coating the particles of the iron ore by the deposition thereon. Therefore, low grade residual oils by vacuum distillation such as those used in the fluid coking process may be used in the process of this invention and any other heavy oils used as the starting material in the FCC process and fluid coking process are suitable as the heavy oil in this process including residual oils by solvent deasphalting, residual oils in thermal cracking, residual oils by catalytic cracking, heavier gas oils, vacuum gas oils and the like. In addition, other oily materials obtained from the sources other than petroleum such as coals, oil sands, oil shales and the like can be used equally.

Incidentally, various kinds of iron ores used in the ordinary iron making process can be used in the present composite process including, in a classification according to the mineral constituent, magnetite, hematite, pyrite, pyrrhotite, limonite, siderite and the like and, according to another classification, those belonging to the types of Kiruna, Taberg, Magnitnaya, Bilbao, Laterite, Algoma, Lake Superior, Clinton, Minette and the like. At any rate, the process of the present invention can be successfully run irrespective of the kind or type of the iron ore when some modifications are undertaken in the process conditions.

Following the above given description for the basic process according to the present invention, several modifications of the process construction are described below in order to show the possibility of further improvement of the efficiency of the process of this invention although the scope of the present invention is by no means limited by and to the following modifications.

The first proposal for the modification of the process of the present invention is the use of a specific type of the gas reformer 16 operated as a fluidized-bed reactor of which the fluidizing medium is a part of the reduced iron transferred from the fluidized-bed reducing furnace 15 to form a recycling circuit. This modification gives several advantages to the process that the facilities for gas reforming may be a relatively small one constructed with much smaller costs than the conventional gas reformer.

In the following, the principle of this modified process is described in detail with reference to the flow sheet shown in FIG. 2 though with some omission or simplification of the description when describing the same subject matter as in the basic process illustrated in FIG. 1.

The fine iron ore is introduced into the ore pre-heater 6 through the duct 7 and the sufficiently heated fine iron ore is sent therefrom to the fluidized-bed thermal cracking reactor 2 through the piping 9 and steam is introduced from piping 12 to form there a stable fluidized bed. The heavy oil in the oil reservoir 1 is introduced into the fluidized-bed thermal cracking reactor 2 through the piping 3 after being pre-heated in the oil pre-heater 4 and thermally cracked in the reactor 2 partly to the products of thermal cracking and partly to the by-product carbonaceous material which is deposited on the particles of the fine iron ore in fluidization to form a coating thereon. In this case, the iron ore is partially reduced according to the condition of the temperature in the reactor 2.

The fine iron ore with carbon deposition formed in the fluidized-bed thermal cracking reactor 2 is mostly recycled to the ore pre-heater 6 through the piping 14 to form a circuit of ore circulation between the reactor 2 and the ore pre-heater 6.

On the other hand, a part of the fine iron ore with carbon deposition is sent from the ore pre-heater 6 to the fluidized-bed reducing furnace 15 at the bottom through the piping 13a connecting the ore pre-heater 6 and the reducing furnace 15 where the ore is reduced to the reduced iron by contacting with a reducing gas at high temperature. A part of the thus formed reduced iron is discharged out of the reducing furnace 15 from the exit piping 20 to be further processed while the balance of the reduced iron is sent and introduced to the fluidized-bed reformer 16 through the piping 31 and acts there as the catalyst to reform the mixture of hydrocarbons and the oxidizing gases such as H$_2$O and carbon dioxide to a reducing gas. The reduced iron acting as the reforming catalyst is in turn partially oxidized and further recycled to the fluidized-bed reducing furnace 15 through the piping 32 to be again reduced to the reduced iron.

In this manner, a circuit for circulation is formed also between the reducing furnace 15 and the reformer 16, the circulating materials from the former to the latter and from the latter to the former being the reduced iron and the partially oxidized reduced iron, respectively.

The product of thermal cracking produced in and discharged out of the fluidized-bed thermal cracking reactor 2 is sent through the piping 11 to the fractionation system 10 where the cracked gas mainly composed of C$_1$–C$_4$ hydrocarbons and hydrogen is separated therefrom. The thus produced cracked gas is combined with the exhaust gas discharged out of the fluidized-bed reducing furnace 15 with carbon dioxide, carbon monoxide, hydrogen, hydrogen sulfide and the like as the main components and introduced into the fluidized-bed reformer 16 where it is converted to a reducing gas mainly composed of carbon monoxide and hydrogen by the catalytic reaction with the reduced iron in fluid state as the catalyst followed by the recycling into the fluidized-bed reducing furnace 15 to be utilized as the reducing agent for the reduction of the fine iron ore.

The above description is an outline of the modified process of the present invention with emphasis on the flow of the materials pertaining to the reactions. Following are further detailed descriptions for the operation and conditions for each of the unit processes as well as the interrelationships between the individual unit processes.

Firstly, the fine iron ore is introduced into the ore pre-heater 6 through the piping 7 and heated therein with the aid of the hot air blown thereinto through the piping 8. The thus heated fine iron ore is, as is mentioned before, circulated between the ore pre-heater 6 and the fluidized-bed thermal cracking reactor 2.

The heated fine iron ore introduced into the fluidized bed thermal cracking reactor 2 is fluidized be means of the steam blown thereinto at the bottom from the piping 12 at a temperature stated before. The heavy oil introduced into the fluidized-bed thermal cracking reactor 2 is thermally cracked there to be converted mostly to the product of thermal cracking composed of the C$_1$–C$_4$ hydrocarbon gases, naphtha, gas oil and residual oil. These hydrocarbon gases are reacted in the reactor 2 with the steam and carbon dioxide according to the following reaction equations given for methane as the C$_1$ hydrocarbon to form a reducing gas composed of carbon monoxide and hydrogen:

CH$_4$→C+2H$_2$ (formation of by-product carbon);

CH$_4$+H$_2$O→CO+3H$_2$; and

CH$_4$+CO$_2$→2CO+2H$_2$.

Further, the fine iron ore is partially reduced by the action of this reducing gas according to the following reaction equations and, simultaneously, the by-product carbon formed in the above mentioned thermal cracking is deposited on the surface of the iron ore particles:

3Fe$_2$O$_3$+CO→2Fe$_3$O$_4$+CO$_2$;

3Fe$_2$O$_3$+H$_2$→2Fe$_3$O$_4$+H$_2$O;

Fe$_3$O$_4$+CO→3FeO+CO$_2$; and

Fe$_3$O$_4$+H$_2$→3FeO+H$_2$O.

While circulating in the recycling circuit between the ore pre-heater 6 and the fluidized-bed thermal cracking reactor 2, the particles of the iron ore are coated with an increasing amount of the carbon deposition in the reactor 2 and eventually discharged out of the ore pre-heater 6 through the piping 13a and sent to the fluidized-bed reducing furnace 15 in the next step. The amount of carbon deposited on iron ore which is sent to the fluidized-bed reducing furnace 15 are controlled by partial oxidation with hot air introduced from piping 8. It should be noted that the discharge of the fine iron ore with carbon deposition out of the ore circulating circuit takes place at the ore pre-heater 6 instead of the fluidized-bed thermal cracking reactor 2 which is the site of discharge in the basic process illustrated with reference to FIG. 1 although these two methods are alternative. Although not particularly determinative, the scheme in FIG. 2 is somewhat more advantageous owing to the higher temperature of the fine iron ore introduced into the fluidized-bed reducing furnace 15 than in the scheme in FIG. 1 because the fine iron ore in the ore preheater 6 can always be at a higher temperature than the ore in the thermal cracking reactor 2.

The reducing reaction of the iron ore in the fluidized-bed reducing furnace 15 takes place in two steps according to the reaction equations given below. When the fine iron ore introduced into the reducing furnace 15 includes some partially reduced iron oxide, e.g. magnetite Fe$_3$O$_4$, formed in the fluidized-bed thermal cracking reactor 2 as is mentioned before, the reduction in the reducing furnace 15 also includes the reduction of this Fe$_3$O$_4$ by hydrogen and carbon monoxide so that the reduction of the iron ore with hydrogen and carbon monoxide taking place in the fluidized-bed reducing furnace is fully expressed by the following set of the reaction equations in two steps.

First step:

Fe$_3$O$_4$+H$_2$→3FeO+H$_2$O

Fe$_3$O$_4$+CO→3FeO+CO$_2$

Second step:

FeO+H$_2$→Fe+H$_2$O

FeO+CO→Fe+CO$_2$

Similarly, the reduction of the fine iron ore by the carbonaceous material deposited on the ore particles is expressed by the following set of the reaction equations.

Fe$_3$O$_4$+4C→3Fe+4CO

FeO+C→Fe+CO

The fluidized-bed reformer 16 serves to produce reducing gas at high temperature by reforming either the cracked gas separated from the products of thermal cracking discharged out of the fluidized-bed thermal cracking reactor 2 to be supplied to the reducing furnace 15. The product of the thermal cracking produced in the thermal cracking reactor 2 and sent to the fractionation system 10 through the piping 11 is composed of the cracked gas and oily fractions. A gaseous mixture composed of the cracked gas of $C_1$–$C_4$ hydrocarbons, carbon dioxide, $H_2O$, carbon monoxide, hydrogen and hydrogen sulfide and obtained by separating high-boiling fractions which are composed of naphtha, gas oil and residual oil by distillation from the product of thermal cracking. A gaseous mixture is supplied to the fluidized-bed reformer 16 through the pipings 17 and 17a after removal, according to need, of the hydrogen sulfide in the desulfurizer 23 and heating in the heater 33 at a temperature insufficient to cause thermal decomposition.

The exhaust gas discharged from the fluidized-bed reducing furnace 15, which is another source of the feed gas to the fluidized-bed reformer 16, is at a temperature of about 700° to 1000° C. and contains, in addition to the hydrogensulfide originating in the sulfur compounds in the heavy oil, carbon dioxide and steam as the products of the reducing reaction along with the unreacted hydrogen and carbon monoxide. The exhaust gas discharged out of the reducing furnace 15 at the top is sent through the piping 21 and cooled therein to the gas purifier 34 to remove the extraneous contents of dust, sulfur compounds and excessive amounts of carbon dioxide and water contained in the exhaust gas and then heated in the heater 36 at a sufficiently high temperature to be combined through the piping 29 with the cracking gas coming from the distillation system 10 and introduced into the fluidized-bed reformer 16.

Figure 2:
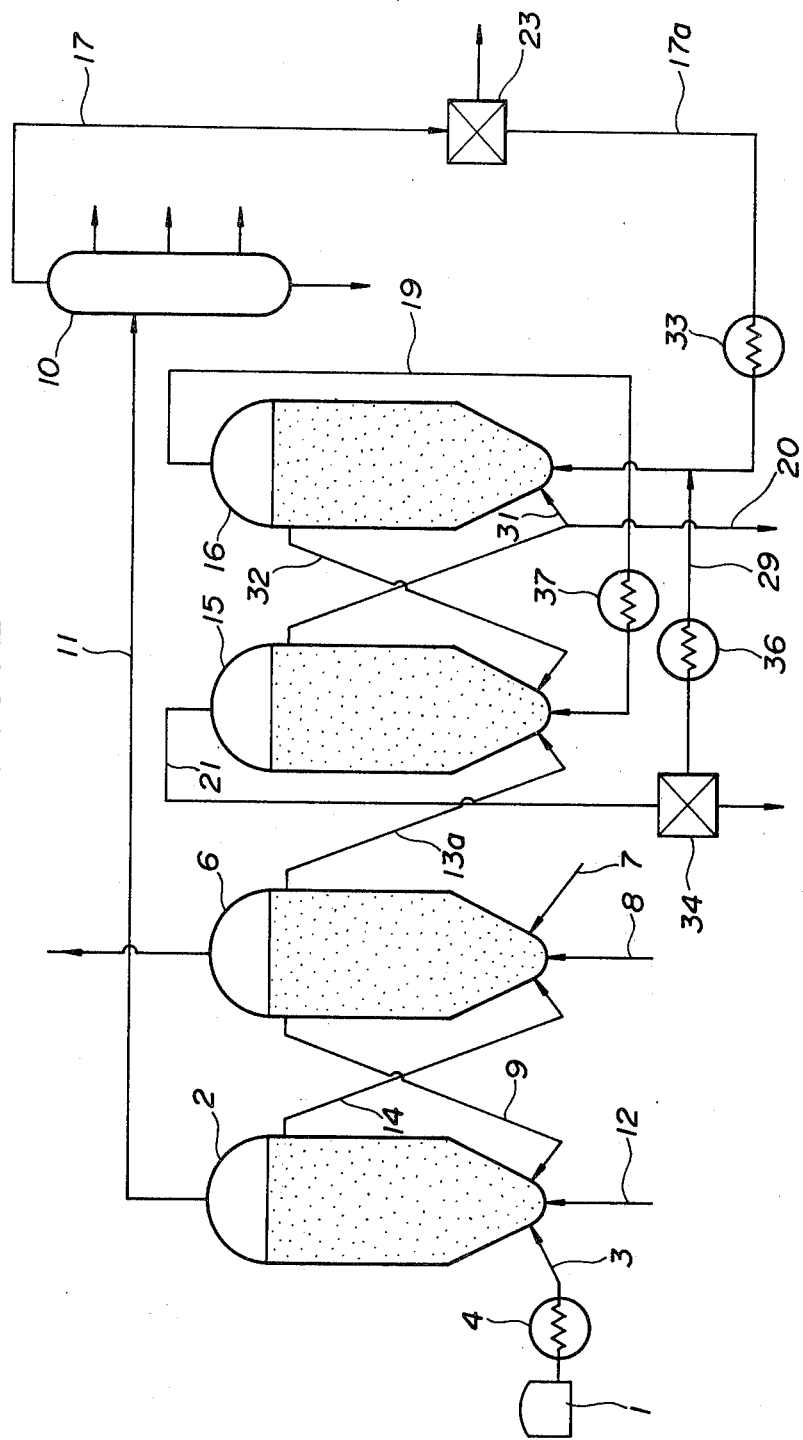
FIG. 2 is a flowsheet of a modified process according to the present invention in which the gas reformer is a fluidized-bed gas reformer with the reduced iron in a fluidized state therein.

The most unique and advantageous feature in this modified process illustrated in FIG. 2 is that the reformer 16 is operated as a fluidized-bed reformer with the fluidized bed formed of the particles of the reduced iron produced in the fluidized-bed reducing furnace 15. That is, a part of the reduced iron formed in the reducing furnace 15 is introduced into the reformer 16 through the piping 31 at the bottom and brought into a fluidized state by means of the gases introduced through the pipings 29 and 17a.

Figure 3:
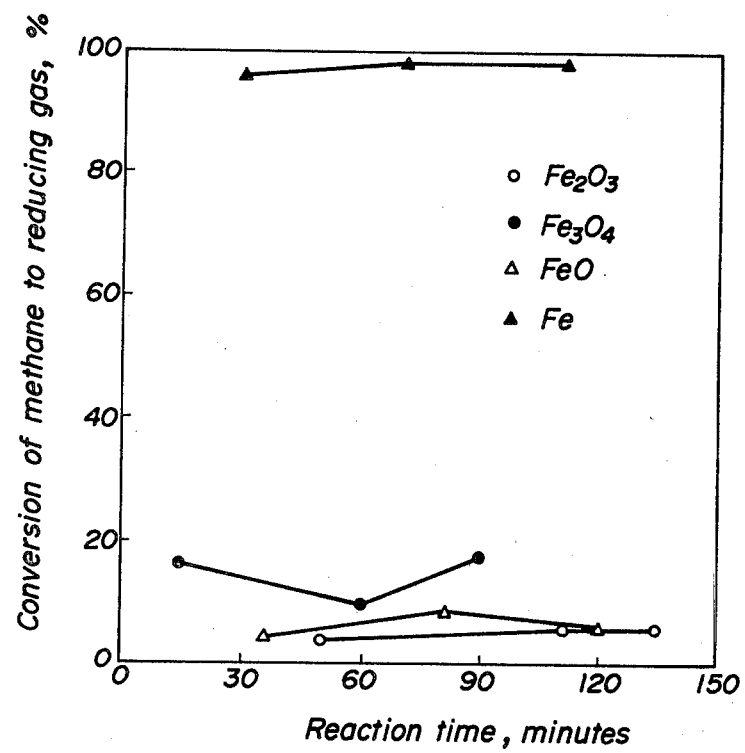
FIG. 3 is a graphic showing of the rate of conversion of methane into a reducing gas on several iron oxides as well as metallic iron as a function of the reaction time.

It has been discovered in the experiments undertaken by the inventors that, while the reaction of reforming of hydrocarbons is scarcely catalyzed by oxides of iron, metallic iron formed by the reduction of the iron oxide exhibits a remarkable catalytic activity for the reaction of reforming. FIG. 3 is a graphic showing of the percent conversion of methane to a reformed reducing gas on a catalyst which is metallic iron or an iron oxide as a function of reaction time. As is clear from this figure, the catalytic activity of metallic iron is much higher than any one of the iron oxides examined. By virtue of this high activity of the metallic reduced iron as a reforming catalyst, the reforming reaction of the feed gas mainly composed of the $C_1$–$C_4$ hydrocarbons with accompanying carbon monoxide, hydrogen, carbon dioxide, steam and the like takes place in the fluidized-bed reformer 16 with high efficiency on the particles of the reduced iron circulating from the fluidized-bed reducing furnace 15 according to the following equations given for methane and ethane, respectively.

For methane:

$$CH_4 + H_2O \rightarrow CO + 3H_2$$

$$CH_4 + CO_2 \rightarrow 2CO + 2H_2$$

For ethane:

$$C_2H_6 + 2H_2O \rightarrow 2CO + 4H_2$$

$$C_2H_6 + 2CO_2 \rightarrow 4CO + 3H_2$$

The thus produced reducing gas rich in the contents of hydrogen and carbon monoxide is sent through the piping 19 and, after being heated in the heater 37, introduced into the fluidized-bed reducing furnace 15 to serve as the reducing agent for the reduction of the fine iron ore.

When the feed gas to the reformer 16 is rich in the contents of the oxidizing gases such as carbon dioxide and steam, partial oxidation of the reduced iron takes place in the fluidized-bed reformer 16 according to the following reaction equations:

$$Fe + H_2O \rightarrow FeO + H_2; \text{ and}$$

$$Fe + CO_2 \rightarrow FeO + CO.$$

These reactions are supplementary to the formation of the reducing gas by the above mentioned decomposition reactions of methane and other hydrocarbons. These reactions are further advantageous in respect of the heat balance in the fluidized-bed reformer 16 since these reactions are exothermic in compensation for the heat requirement by the endothermic decomposition reactions of the methane and other hydrocarbons.

The reduced iron thus partially oxidized in the reformer 16 is recycled to the fluidized-bed reducing furnace 15 through the piping 32 to form a circuit for circulation therebetween.

The thermal conditions in the reformer 16 are important to obtain a high efficiency in the above mentioned reactions taking place in the reformer 16 and the temperature in the reformer 16 is usually maintained at 700° to 1100° C. or, preferably, 800° to 1000° C. by the control of the heaters 33 and 36 for the feed gases to the reformer 16.

The largest advantages obtained in this modification of the process of this invention is the extremely high efficiency in the reforming of the hydrocarbons contained in the cracked gas to be converted to the reducing gas in the reformer 16. This advantage is obtained by virtue of the characteristics of the fluidized-bed per se and the high catalytic activity of the reduced iron in the fluidized-bed reformer 16. Therefore, the reducing gas produced in the reformer 16 contains methane and other hydrocarbons in a very low proportion.

Figure 4:
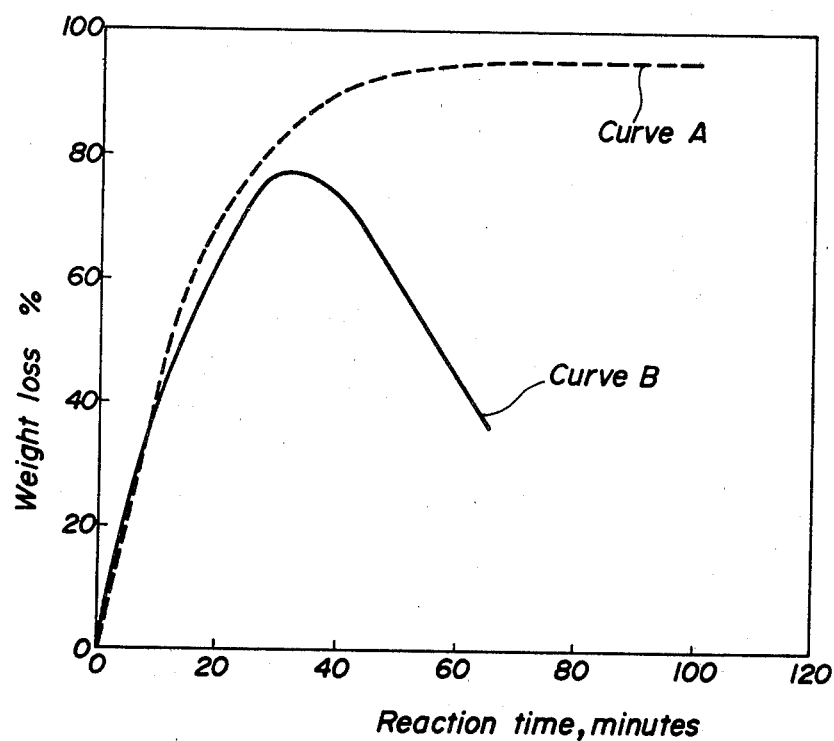
FIG. 4 is a graphic showing of the rate of reduction of an iron oxide with a methane-rich reducing gas or a low-methane reducing gas as a function of the reaction time.

The advantage obtained in this modification is well understood from the comparative results shown in FIG. 4 graphically illustrating the weight loss percent of an iron oxide in two kinds of reducing gases with different methane contents as a function of the reaction time. The ordinate of the graph is graduated with the amount of weight loss in the iron oxide during reaction in % based on the initial content of the iron oxide before the reaction. Curve A (broken line) shows the results obtained at 860° C. in typical reducing gas of low methane content composed of 36% of carbon monoxide, 55% of hydrogen, 5% of carbon dioxide and 4% of methane, and Curve B (solid line) shows the results obtained at 950° C. in a example gas of this invention composed of 40% of methane, 20% of hydrogen and 40% of nitrogen.

As is understood from this figure, the weight loss of iron oxide with a low-methane reducing gas proceeds rapidly and at about 60 minutes the weight loss ratio reaches about 95% and after then its ratio is kept constantly. This means the iron oxide is rapidly reduced into metallic iron and reduction ratio reaches about 95% after 60 minutes. While, the weight loss of the iron oxide with a high-methane reducing gas also proceeds rapidly until the weight loss ratio reaches at about 75%, however, after then the weight loss ratio decreases rapidly. This means, in the high-methane atmosphere, two reactions $$Fe_2O_3 + H_2 \rightarrow 2Fe + 3H_2O$$

$$CH_4 \rightarrow C + 2H_2$$

occur concurrently, and the former reaction (reduction of iron oxide) brings weight loss to iron oxide and the latter one (cracking of methane) brings weight increasing to iron oxide because of the deposition of carbon on the surface of the iron oxide particles. The beginning of the reaction, the weight decreasing rate due to the reduction of iron oxide is larger than the weight increasing rate on account of the carbon deposition, but after about 30 minutes, the weight increasing rate becomes larger than the weight decreasing rate. Therefore, the weight loss (%) decreases after 30 minutes in Curve B. This carbon deposition on the surface of iron ore, as mentioned above, contributes to prevent the iron ore particles from sintering and agglomerating them in the fluidized-bed reducing furnace.

When the cracking gas from the thermal cracking reactor 2 or the exhaust gas from the reducing furnace 15 is reformed in accordance with the modified process of the invention, advantages are obtained in that not only the hydrocarbons are almost completely reformed into the reducing gas but also the oxidizing gases such as carbon dioxide and $H_2O$ contribute to the formation of the reducing gas by the reaction with the metallic iron as the catalyst to give a reducing gas of extremely low content of hydrocarbons so that reduced iron of high quality can be produced very efficiently.

In the following, a further improvement of the above given modified process of the invention is described in detail. The principle of the further improvement is that, whereas, in the above modified process, a recycling circuit of the reduced iron is formed between the fluidized-bed reducing furnace 15 and the fluidized-bed reformer 16 with an object to utilize the reduced iron as the catalyst for the reforming reaction in the reformer 16, a second fluidized-bed reducing furnace is provided in series with the first reducing furnace 15 and the reformer 16 and the partially oxidized reduced iron discharged out of the fluidized-bed reformer 16 is introduced into the second reducing furnace where it is again reduced into completely reduced iron satisfactory as the product of reduced iron. The reducing gas produced in the reformer 16 is twice utilized in both the first and the second reducing furnaces in series along the route of from the first reducing furnace to the second or vice versa.

An outline of the above improved process is described below with reference to the flow sheet illustrated in FIG. 5 though with some omission and simplification of the explanation when describing the same subject matter already discussed.

The circulation of the fine iron ore in the circuit including the ore pre-heater 6 and the fluidized-bed thermal cracking reactor 2 for the heavy oil connected by the pipings 9 and 14 is just the same as in the preceding modified process and not repeated here. The fine iron ore circulating in this circuit and gradually coated with carbon deposition is discharged out of the circulating system and sent to an ore heater 38 through the piping 39 to be sufficiently heated there before it is introduced into the first fluidized-bed reducing furnace 15 through the piping 40. The fine iron ore introduced into the first fluidized-bed reducing furnace 15 is reduced there with the reducing gas blown thereinto at the bottom in just the same manner as in the previously described processes and converted to the reduced iron which may contain small amounts of iron oxide FeO in the metallic iron.

The reduced iron formed in the first fluidized-bed reducing furnace 15 is usually sent to the fluidized-bed reformer 16 through the piping 31 and serves as a catalyst for the reforming reaction of the feed gas composed of hydrocarbons and oxidizing gases mainly of carbon dioxide and $H_2O$ into a reducing gas. The reduced iron in this reformer 16 is in turn partially oxidized as a result of the reforming reaction with increased contents of the iron oxide FeO and, instead of being recycled to the first fluidized-bed reducing furnace 15, is sent to the second fluidized-bed reducing furnace 15a where it is again reduced completely into metallic reduced iron and discharged therefrom to be processed in the succeeding steps.

The products of thermal cracking discharged out of the fluidized-bed thermal cracking reactor 2 are sent to the fractionation system 10 through the piping 11 and the cracked gas mainly composed of the $C_1$–$C_4$ hydrocarbons is separated therefrom in this fractionation system 10. The cracked gas is introduced into the fluidized-bed reformer 16 through the pipings 17 and 17a together with the exhaust gas composed of carbon dioxide, $H_2O$, hydrogen and the like as discharged out of the first fluidized-bed reducing furnace 15 coming through the pipings 21 and 29 and reformed in this reformer 16 into a reducing gas mainly composed of carbon monoxide and hydrogen by the catalytic activity of the reduced iron as the catalyst in the fluidized state. The reducing gas is introduced into the second fluidized-bed reducing furnace 15a and utilized there as the reducing agent for the finishing reduction of the partially oxidized reduced iron coming from the fluidized-bed reformer 16 through the piping 32a. The exhaust gas discharged out of the second fluidized-bed reducing furnace 15a which is a gaseous mixture of mainly carbon monoxide, hydrogen and small amount of carbon dioxide and water is introduced as such into the first fluidized-bed reducing furnace 15 through the piping 42 after being re-heated in the heater 43 and utilized there for the reduction of the fine iron ore.

Following the above described outline of the material flow in this improved process of the invention, details are given below of the operational conditions in each of the steps and the interrelationships between the steps.

The operation of the ore pre-heater 6 and the fluidized-bed thermal cracking reactor 2 is performed in much the same manner as described before forming a circuit for the circulation of the fine iron ore and hence not repeated here.

The fine iron ore circulating in the circuit including the ore pre-heater 6 and the fluidized-bed thermal cracking reactor 2 and having been coated with the carbon deposition is partly taken out of the ore pre-heater 6 and sent to the ore heater 38 through the piping 39 to be re-heated there before being introduced into the first fluidized-bed reducing furnace 15. The re-heating of the fine iron ore in the ore heater 38 is performed by the combustion of a part of the deposited carbon on the fine iron ore with the hot air blown thereinto through the piping 44 at the bottom of the ore heater 38. By this means, the temperature of the fine iron ore is increased in the ore heater 38 to about 700° to 1200° C. or, preferably, 800° to 1000° C.

The ore heater 38 is intermediary between the thermal cracking system composed of the ore pre-heater 6 and the thermal cracking reactor 2 and the succeeding reduction system for the production of the reduced iron with a function of reheating the fine iron ore with carbon deposition sent from the thermal cracking system to a temperature suitable for the succeeding process of reduction. Therefore, the capacity of the ore heater 38 can be smaller with smaller volumes of the hot air supply at the bottom when the fine iron ore with carbon deposition is taken out of the ore pre-heater 6 than out of the thermal cracking reactor 2 as is illustrated in FIG. 1 since the fine iron ore in the ore pre-heater 6 is at a temperature substantially higher than in the thermal cracking reactor 2. It is of course optional to transfer the fine iron ore with carbon deposition from the thermal cracking reactor 2 to the ore heater 38 through the piping 45 shown by a broken line in FIG. 5. In this case, an advantage is obtained that the re-heated fine iron ore sent to the reduction system may have a larger amount of the carbon deposition. The fine iron ore re-heated thus in the ore heater 38 is sent to the first fluidized-bed reducing furnace 15 through the piping 40 and reduced there with the reducing gas at a high temperature of 800° to 1000° C. through the piping 42 after being heated in the heater 43. The fine iron ore is reduced in the first fluidized-bed reducing furnace 15 into reduced iron and the reduced iron is introduced into the fluidized-bed reformer 16 through the piping 31.

The fluidized-bed reformer 16 serves to reform the cracking gas separated from the thermal cracking product in the thermal cracking reactor 2 and the exhaust gas discharged out of the first fluidized-bed reducing furnace 15 into a reformed reducing gas at high temperature. The exhaust gas from the first fluidized-bed reducing furnace 15 is sent to the reformer 16 through the pipes 21 and 29, in the course of which the gas is purified in the gas purifier 34 and heated in the heater 36. The heater 36 is preferably a furnace heated by combustion of petroleum fuels and the like and the exhaust gas at high temperature in this heater 36 is preferably sent to the heater 33 through the piping 46 to fully utilize the thermal energy for heating the cracked gas on the way from the fractionation system 10 to the fluidized-bed reformer 16.

The reforming reactions taking place in the reformer 16 and the high catalytic activity as a reforming catalyst over several kinds of iron oxides have been fully explained previously with reference to FIG. 3 and not repeated here. In this case, the reducing gas produced in this reformer 16 is introduced into the second fluidized-bed reducing furnace 15a through the piping 19a if necessary, through gas purification 34 after reheating in the heater 37a to be used as the reducing agent for the finishing reduction of the partially oxidized reduced iron as described hereinafter.

The reduced iron acting as a catalyst for the reforming in the reformer 16 is, as is mentioned before, partially oxidized by the oxidizing gas, e.g. carbon dioxide and $H_2O$, and the reduced iron containing an increased amount of iron oxide FeO is introduced into the second fluidized-bed reducing furnace 15a through the piping 32a. This second fluidized-bed reducing furnace 15a is for the finishing reduction of the partially oxidized reduced iron and the reducing reaction proceeds with high efficiency by the fluidizing contact of the reduced iron with the reducing gas of high reducing power at a temperature of 800° to 1200° C. or, preferably, 800° to 1000° C. blown into the furnace 15a at the bottom. The thus finished reduced iron contains metallic iron in a high proportion of, usually, at least 90% or, under favorable conditions, at least 95% based on the total content of iron and taken out of the second reducing furnace 15a to be further processed in the succeeding steps.

The discharged gas at the top of the second fluidized-bed reducing furnace 15a still has sufficiently high reducing power so that the gas is further sent to the first fluidized-bed reducing furnace 15 through the piping 42 after being reheated in the heater 43. That is, the gas is circulated in the circuit of the first reducing furnace 15 to the reformer 16 to second reducing furnace 15a to the first. It is of course within the scope of the present invention that the circulation of the reducing gas is reversed so that the reducing gas produced in the fluidized-bed reformer 16 is first introduced into the first fluidized-bed reducing furnace 15 and then into the second fluidized-bed reducing furnace 15a. In this reversed circulation of the reducing gas, the gas discharged out of the first reducing furnace 15 is sufficiently purified in the gas purifier 34 to remove the impurities such as hydrogen sulfide and carbonyl sulfide and excess volumes of carbon dioxide and $H_2O$ and heated in the heater 36 before introduction into the second reducing furnace 15a.

Figure 5:
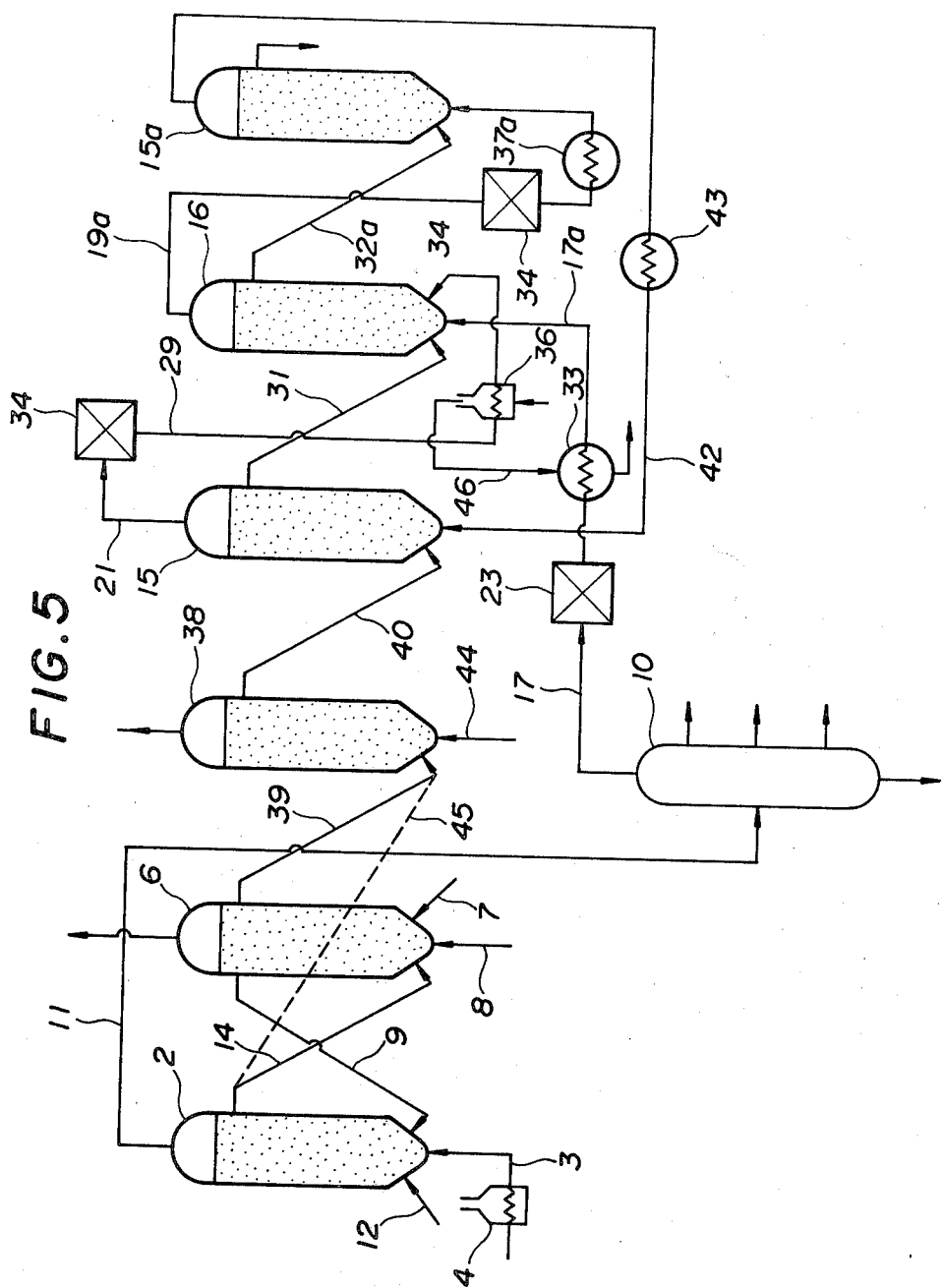
FIG. 5 is a flowsheet of a further improved process according to the present invention in which the reduced iron partially oxidized in the fluidized-bed gas reformer is again reduced in a separately installed second fluidized-bed reducing furnace.

The advantages obtained in the improved composite process illustrated by the flow sheet in FIG. 5 are summarized as below.

(a) An ore heater 38 is installed between the circuit for the thermal cracking of heavy oils and carbon deposition on the fine iron ore and the system for the reduction of the fine iron ore. By virtue of this separate ore heater 38, the thermal conditions in the first circulating system are not constrained by the temperature condition of the fine iron ore to be introduced into the first reducing furnace 15 and can be set at the optimum. In other words, the thermal conditions in the thermal cracking reactor 2 can be controlled independently from the operational conditions in the reducing furnace so that highest efficiency is readily ensured in the thermal cracking of the heavy oils and carbon deposition on the iron ore particles and still the first reducing furnace can be operated at a high efficiency with the fine iron ore introduced thereinto at the optimum temperature as being heated in the ore heater 38.

(b) The reduction of the iron ore into reduced iron is performed in two steps with the step of gas reforming therebetween so that the reducing reaction can be performed smoothly under favorable conditions avoiding excessively violent proceeding of the reaction and the quality of the reduced iron is very high. Further, the reaction of reforming in the gas reformer is imparted with larger versatility in respect of the feed material because the reforming reaction in the reformer 16 is less restricted by the conditions for the reduction of the iron ore.

(c) Further, the unique construction of the circuit for the circulation of the reducing gas contributes to the improvement of the efficiency in the gas reforming as well as the smoothness of the reducing reaction of the fine iron ore.

Summarizing the present process as proposed here, the largest advantage obtained is the very smooth and efficient proceeding of the reducing reaction of the fine iron ore in a fluidized state in the reducing furnace or furnaces at the temperature of more than 900° C. without causing sintering. This is primarily due to the effect of the carbon deposition on the iron ore particles which ensures rapid oxidation-reduction reaction between the fine iron ore and the reducing gas in the reducing furnace partly by preventing sintering phenomenon of the iron ore particles and partly by serving as a reducing agent for the reduction of the iron ore. This effect cannot be within expectation from the prior art technology.

In the following, several examples are given to illustrate the process of this invention in further detail. It should be understood that further modification or improvement is not excluded by these examples within the scope of the present invention.

Example 1

Thermal cracking of Ta-ch'ing vacuum residual oil was conducted in a fluidized-bed of fine iron ore having a particle size distribution that about 65% by weight thereof passed a screen of 105 μm mesh opening sieve. The composition of the iron ore was: total iron (TFe) 64.57%; Feo 0.13%; and $SiO_2$ 4.98%. The reaction temperature was 550° C. and the feed rates of the residual oil and the fine iron ore were 8 liters/hour and 33 kilograms/hour, respectively.

The examination with a polarization microscope of the cross section of the iron ore particles discharged out of the fluidized-bed clearly indicated that the surface of the iron ore particles was covered by the carbonaceous material deposited thereon.

Comparative experiments of reduction of the fine iron ore with or without carbon deposition were undertaken with a reducing gas composed of 70% by volume of hydrogen and 30% by volume of carbon monoxide under atmospheric pressure supplied at a rate of 8 N $m^3$/kilograms in each case.

In the case of the fine iron ore without carbon deposition, the reducing reaction in the fluidized bed could be continued no longer when the reaction temperature had reached about 800° C. due to the sintering phenomenon of the iron ore particles beginning at that temperature. On the contrary, no sintering took place at all in the reduction of the fine iron ore with carbon deposition even at a temperature of 940° C. or higher. In addition, the reduced iron produced from the fine iron ore with carbon deposition was excellent in respect of the composition containing 88.1% of total iron (TFe), 81.5% of metallic iron (MFe) and 2.4% of carbon in support of the superiority of the composite process of this invention over the conventional methods in the prior art.

Example 2

The same comparative experiments of iron ore reduction were repeated as in Example 1 except that the reducing gas used for the reduction of the same fine iron ore with or without carbon deposition in a fluidized bed was composed of 36% by volume of carbon monoxide, 55% by volume of hydrogen, 5% by volume of carbon dioxide and 4% by volume of water.

The results were that the reducing reaction in the fluidized-bed was discontinued at about 790° C. when the fine iron ore was without carbon deposition due to the sintering of the particles while the reducing reaction with the fine iron ore with carbon deposition could be continued smoothly without sintering even at a temperature of 950° C. or higher. The reduced iron produced in this case contained 88.1% of total iron (TFe), 83.7% of metallic iron (MFe) and 2.4% of carbon to give a high metallization of 95.0%.

Example 3

The cracked gas separated from the product of thermal cracking of the heavy oil in Example 1 was composed of 60% by volume of hydrocarbons of the composition $CH_{2.5}$, 20% by volume of $H_2O$, 8% by volume of carbon dioxide and 12% by volume of hydrogen. On the other hand, the exhaust gas discharged out of the fluidized-bed reducing furnace operated in Example 2 was composed of 15.5% by volume of carbon dioxide, 22.0% by volume of $H_2O$, 20.8% by volume of carbon monoxide and 35.6% by volume of hydrogen.

A feed gas prepared by mixing the above described cracked gas and the exhaust gas in a proportion was supplied to a fluidized-bed gas reformer in which the fluidized-bed at 900° C. was formed of the particles of the reduced iron obtained in the reducing experiment of Example 2. The reducing gas produced by this reforming reaction was composed of 34% by volume of carbon monoxide, 57% by volume of hydrogen and 4% by volume of $C_1$-$C_4$ hydrocarbons.

For comparison, the fluidized-bed in the gas reformer was formed of the fine iron ore before reduction instead of the reduced iron and reforming of the same feed gas was tried under the same operational conditions. The result was that the conversion of the feed gas to the reducing gas was only about 4%.

Example 4

The results of the analysis undertaken of the reduced iron having been used as the reforming catalyst in the gas reformer in Example 2 were that the reduced iron was composed of 88.5% of total iron (TFe), 67.5% of metallic iron (MFe) and 2.2% of carbon with the metallization of 76.3% indicating that the reduced iron had been partially oxidized during the reforming reaction.

A second reduction of the above partially oxidized reduced iron forming a fluidized-bed was conducted at 950° C. with the reducing gas produced in Example 3 as the reducing agent. The reducing reaction could be run smoothly without sintering of the particles. The reduced iron thus obtained in the finishing reduction contained 88.6% of total iron (TFe), 85.9% of metallic iron (MFe) and 2.0% of carbon with the metallization of 97.0% indicating the high quality of the reduced iron.

What is claimed is:

1. A process for concurrently carrying out production of reduced iron and thermal cracking of a heavy oil which comprises the steps of
    (a) introducing a fine iron ore and a heavy oil into a fluidized-bed thermal cracking reactor to effect thermal cracking of the heavy oil at a temperature in the range of 500° to 600° C. into products of thermal cracking and carbonaceous by-product material which is deposited on the particles of the fine iron ore; said heavy oil being a vacuum distillation residue oil having a Conradson carbon value of 5 to 35% and a specific gravity of 0.9 to 1.10, and said fine iron ore being in the form of particles having an average diameter of about 10–30 μm, (b) introducing the fine iron ore with deposits of said carbonaceous material formed in the step (a) into a first fluidized-bed reducing furnace and contacting a reducing gas at high temperature blown thereinto in a fluidized state to reduce the fine iron ore into reduced iron at a temperature in the range from 800° to 1000° C. and to form an exhaust gas, (c) separating a cracked gas, light oil and residual oil by distillation from said products of thermal cracking formed in the step (a) in a fractionation system, (d) transferring a part of said reduced iron formed in step (b) to a gas reformer and forming a fluidized-bed of said transferred reduced iron in said gas reformer and reforming said cracked gas or said residual oil by contact with the fluidized reduced iron in said gas reformer into a reducing gas mainly composed of hydrogen and carbon monoxide, and (e) blowing the reducing gas into the fluidized-bed reducing furnace.

2. The process of claim 1 which further comprises (f) pre-heating the fine iron ore in an ore pre-heater and passing said pre-heated ore to said fluidized-bed thermal cracking unit.

3. The process as claimed in claim 2 wherein a part of the fine iron ore with deposits of the carbonaceous material is recycled to the ore pre-heater from said thermal cracking reactor.

4. The process of claim 3 wherein the heat for pre-heating the fine iron ore in the ore pre-heater is supplied by the combustion of a part of the carbonaceous material deposited on the particles of the fine iron ore with air.

5. The process of claim 1 wherein the residual oil from the fractionation system is recycled to a fluidized-bed thermal cracking reactor.

6. The process of claim 1 wherein the reduced iron in the reformer is partially oxidized during the reforming reaction and is again reduced to completely reduced iron.

7. The process of claim 6 wherein the reduction of the partially oxidized reduced iron to completely reduced iron is effected in the fluidized-bed reducing furnace by recycling the partially oxidized reduced iron thereinto.

8. The process of claim 6 wherein the reduction of the partially oxidized reduced iron to completely reduced iron is effected in a second fluidized-bed reducing furnace by contact with a reducing gas.

9. The process of claim 2 wherein a part of the exhaust gas from the fluidized-bed reducing furnace is introduced into the ore pre-heater to be burned therein to supply the heat to preheat the fine iron ore.

10. The process of claim 1 wherein a part of the exhaust gas discharged from the fluidized-bed reducing furnace is purified to remove impurities and then recycled to the fluidized-bed reducing furnace.

11. The process of claim 1 wherein a part of the exhaust gas discharged from the fluidized-bed reducing furnace is purified to remove impurities and then introduced into the gas reformer.

12. The process of claim 3 wherein the fine iron ore with deposits of the carbonaceous material taken from the ore preheater is fed to the fluidized-bed reducing furnace.

13. The process of claim 3 wherein the fine iron ore with deposits of the carbonaceous material taken from the fluidized bed thermal cracking reactor is fed to the fluidized-bed reducing furnace.

14. The process of claim 2 wherein the fine iron ore is pre-heated in the ore pre-heater in a fluidized state.

15. The process of claim 1 which further comprises (g) heating the fine iron ore with deposits of the carbonaceous material in an ore heater which is not in a recycle circuit with said thermal cracking reactor to heat said ore and then feeding said heated ore to a first fluidized-bed reducing furnace.

16. The process of claim 15 wherein the fine iron ore with deposits of the carbonaceous material is heated in the ore heater in a fluidized state.

17. The process of claim 15 wherein the heat for the heating of the fine iron ore with deposits of the carbonaceous material in the ore heater is supplied by the combustion of a part of the carbonaceous material with air.

18. The process of claim 15 wherein a part of the reduced iron formed in said first fluidized-bed reducing furnace is recycled to the ore heater.

19. The process of claim 8 wherein the reducing gas formed in the gas reformer is fed sequentially first to the second fluidized-bed reducing furnace and then to the first fluidized-bed reducing furnace.

20. The process of claim 8 wherein the reducing gas formed in the gas reformer is fed sequentially first to the first fluidized-bed reducing furnace and then to the second fluidized-bed reducing furnace.

21. The process of claim 3 wherein at least 70% and at most 30% of the fine iron ore with deposits of the carbonaceous material discharged out of the fluidized-bed thermal cracking reactor are introduced into the ore pre-heater and into the first fluidized-bed reducing furnace, respectively.

22. The process of claim 21 wherein said fine iron ore is in the form of particles having an average diameter of about 20 to 200 μm.

23. The process of claim 15 wherein at least 70% and at most 30% of the fine iron ore with deposits of the carbonaceous material discharged out of the fluidized-bed thermal cracking reactor are introduced into the ore pre-heater and into the ore heater, respectively.

24. The process of claim 23 wherein said fine iron ore is in the form of particles having an average diameter of about 20 to 200 μm.

25. The process of claim 1 wherein the boiling point of the heavy oil introduced into a fluidized-bed thermal cracking reactor is more than 900° F. (482° C.).

26. The process of claim 1 wherein the boiling point of the heavy oil introduced into a fluidized-bed thermal cracking reactor is more than 950° F. (510° C.).

* * * * *